July 6, 1926.

P. S. EKSTRAND 1,591,162

STEERING DEVICE

Filed Oct. 10, 1924

2 Sheets-Sheet 1

WITNESSES

Inventor
PETER S. EKSTRAND

By Richard B. Owen
Attorney

July 6, 1926.
P. S. EKSTRAND
1,591,162
STEERING DEVICE
Filed Oct. 10, 1924
2 Sheets-Sheet 2
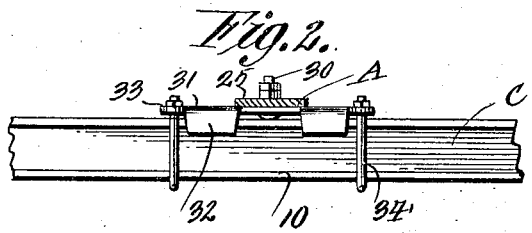
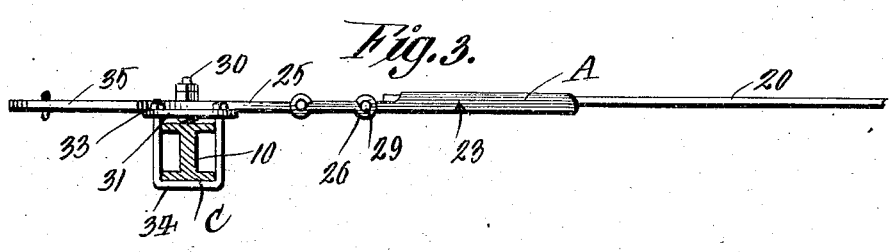
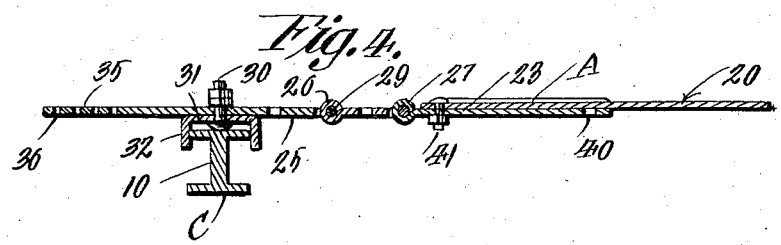
WITNESSES
Inventor
PETER S. EKSTRAND Patented July 6, 1926.

1,591,162

UNITED STATES PATENT OFFICE.

PETER S. EKSTRAND, OF LUTSEN, MINNESOTA.

STEERING DEVICE.

Application filed October 10, 1924. Serial No. 742,911.

This invention appertains to attachments for automobiles and the primary object of the invention is to provide an improved device for facilitating the pulling of a disabled automobile or trailer by a leading vehicle.

Another object of the invention is to provide an improved towing device having means for automatically steering the vehicle being towed, thereby dispensing with a driver for the said vehicle.

A further object of the invention is to provide an improved towing device having a novel hinged joint therein, for permitting movement of the vehicles connected together relative to one another incident to the travel of the vehicle over a roadway.

A further object of the invention is to provide novel means for connecting the towing device to the vehicle being towed whereby undue strain will be eliminated on the towed vehicle.

A still further object of the invention is to provide a novel towing device of the above character which can be readily taken apart and folded into a compact bundle to permit the same to occupy a minimum amount of space during shipping or storage.

A still further object of the invention is to provide a novel towing device which will be durable and efficient in use, one that will be simple and easy to manufacture and one which can be placed upon the market at a small cost.

Figure 1:
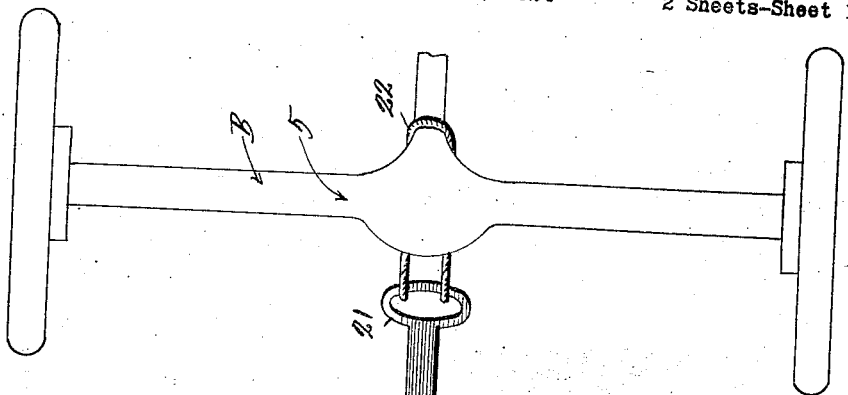
Figure 1:
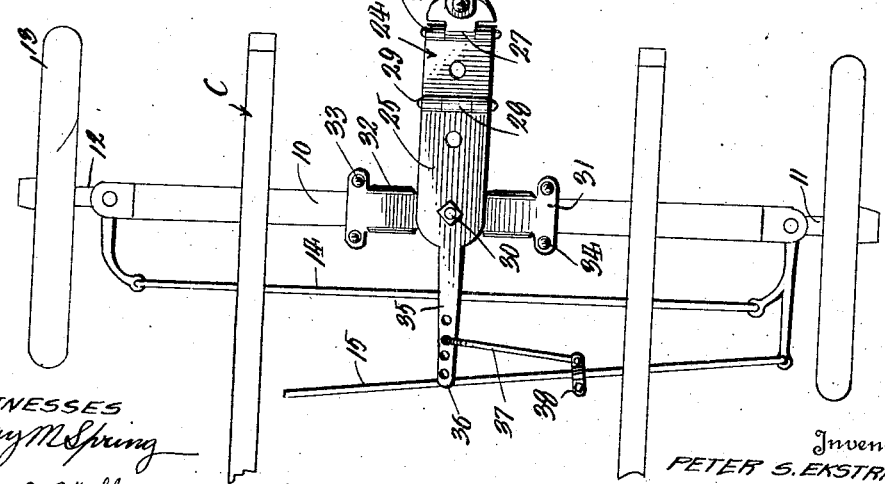

With these and other objects in view, the invention consists in the novel construction, arrangement and formation of parts, as will be hereinafter more specifically described, claimed and illustrated in the accompanying drawing, in which drawings, Figure 1 is a plan view of the improved towing device showing the same connected with a leading vehicle and a vehicle to be towed, Figure 2 is a detail section through the improved towing device showing the same connected to the front dead axle of a vehicle being towed, Figure 3 is a fragmentary edge elevation of the improved device showing the same attached to a front dead axle of the vehicle being towed, the axle being shown in cross section, Figure 4 is a fragmentary longitudinal section through the improved device showing the same attached to the front dead axle of a vehicle to be towed, the axle being shown in cross section.

Referring to the drawings in detail, wherein similar reference characters designate corresponding parts throughout the several views the letter A generally indicates the improved device; B the vehicle with which the same is connected and C the vehicle which is to be towed.

The vehicle B is of the usual or any preferred character and comprises the usual differential housing 5 to which the towing device A is adapted to be connected.

The vehicle C which is to be towed, has simply been shown to illustrate the use of the improved device A which can be considered as a disabled automobile or as a trailer.

As shown the vehicle C embodies a front dead axle 10 having connected therewith in the ordinary manner the steering knuckles 11 and 12 which support the front steering wheels 13. The knuckles 11 and 12 are connected together by the ordinary connecting rod 14 and the knuckles are operated from the steering gear (not shown) by the usual drag link 15.

The improved towing device A comprises a flat metal pull bar 20 having an enlarged open head 21 formed thereon at its forward end, which is adapted to receive the connecting cable 22 secured to the differential housing 5. The rear end of the pull bar 20 is slidably mounted within a guide 23, which in turn is connected by means of a swinging link 24 with the pull head 25. The link 24 has formed on its opposite ends hinge barrels 26 which are adapted to align with hinge barrels 27 and 29 respectively formed on the inner ends of the guide 23 and the head 25. The aligned hinge barrels 26 and 27 and the aligned hinge barrels 28 receive hinge pins 29.

The pull head 25 is operatively connected by means of a king bolt 30 with a novel clamp 31 which is adapted to engage the dead axle 10.

The clamp 31 rests on the upper surface of the dead axle 10 and is of substantially the same width as the axle and is provided with pairs of depending lips 32 on each side of the transverse center thereof which are adapted to embrace the opposite faces of the dead axle. The outer ends of the clamp 31 have formed thereon laterally projecting ears 33 which receive U-shaped clamping bolts 34 which straddle the said dead axle.

By this construction it can be seen that the towing device can be readily and easily connected with the vehicle to be towed.

In order to permit the steering of the vehicle being towed by the leading vehicle a radially extending arm 35 is formed rigidly on the pull head 25 and this arm has formed therein a plurality of spaced openings 36. A pull link 37 is adapted to be placed in any one of the openings 36 and the outer end thereof is pivotally connected to a clamp 38 which is secured at any preferred point to the drag link 15.

From the foregoing it can be seen that when the leading vehicle makes a turn that the pull head 25 will swing on the king bolt 30 and consequently exert a pull on the drag link 15 through the medium of the connecting link 37 thereby bringing about the steering of the front wheels 13 of the vehicle being towed.

In order to permit the detachable connection of the pull bar 20 with the guide 23, the guide 23 is provided at spaced points with openings 40 in any one of which is adapted to be inserted a bolt 41 carried by the extreme rear end of the said pull bar.

When the pulling device is not in use the bolt 41 is disconnected from the guide 23 and the clamp 31 is removed from the dead axle 10 as well as the cable 22 from the differential housing 5. The king bolt 30 can also be removed from the clamps 31 and it is obvious that the device can be packed into a relatively small area.

Changes as to details may be made without departing from the spirit or the scope of this invention, but:—

What I claim as new is:—

1. As a new article of manufacture a towing device for motor vehicles comprising an elongated flat draw bar, an enlarged open head carried by the forward end of the draw bar, a draw head, a transversely extending clamp, depending lips formed on the clamp, laterally extending ears carried by the clamp, U-shaped bolts associated with the ears, means pivotally connecting the draw head with the clamp, a rearwardly extending steering arm formed on the draw head, a guide arranged to slidably receive the draw bar, means detachably connecting the draw bar with the guide, a link, means pivotally connecting the link to the draw head and to said guides.

2. The combination with a leading vehicle including a differential housing and a following vehicle including a dead axle, and a drag link, of a towing device for connecting the leading and the following vehicles together including a draw bar, an enlarged open head carried by the forward end of the draw bar, flexible means for connecting the open head with the differential housing of the leading vehicle, a transversely extending clamp arranged to embrace the dead axle, a draw head pivotally connected to the clamp, a rearwardly extending steering arm formed on the draw head, means adjustably connecting the steering arm with the drag link, a guide arranged to receive the draw bar, means adjustably and detachably connecting the draw bar with the guide, a link, and means pivotally connecting the link to the draw head and to said side.

In testimony whereof I affix my signature.

PETER S. EKSTRAND.